(12) United States Patent
Fellinger et al.

(10) Patent No.: US 10,782,046 B2
(45) Date of Patent: Sep. 22, 2020

(54) METHODS, MATERIALS, AND EQUIPMENT TO FORM IMPROVED FIT DUCT LINER INSULATION FOR ROUND AND OVAL HVAC DUCT SYSTEMS

(71) Applicant: JOHNS MANVILLE, Denver, CO (US)

(72) Inventors: Thomas John Fellinger, Littleton, CO (US); Michaela Roxane Roy, Centennial, CO (US); Brennan Hall, Arvada, CO (US); Ames Kulprathipanja, Broomfield, CO (US); Eric Adamczyk, Littleton, CO (US)

(73) Assignee: Johns Manville, Denver, CO (US)

( * ) Notice: Subject to any disclaimer, the term of this patent is extended or adjusted under 35 U.S.C. 154(b) by 42 days.

(21) Appl. No.: 16/013,260

(22) Filed: Jun. 20, 2018

(65) Prior Publication Data

US 2019/0390870 A1    Dec. 26, 2019

(51) Int. Cl.
*F16L 59/02* (2006.01)
*F24F 13/02* (2006.01)
*F16L 59/147* (2006.01)
*B32B 3/30* (2006.01)

(52) U.S. Cl.
CPC ........ *F24F 13/0263* (2013.01); *F16L 59/029* (2013.01); *F16L 59/147* (2013.01); *B32B 3/30* (2013.01); *B32B 2255/205* (2013.01); *B32B 2255/26* (2013.01); *B32B 2307/304* (2013.01); *B32B 2307/7265* (2013.01); *B32B 2597/00* (2013.01)

(58) Field of Classification Search
CPC ................ B32B 3/28; B32B 3/30; F16L 9/14

USPC ................................ 138/149, 151, 156, 128
See application file for complete search history.

(56) References Cited

U.S. PATENT DOCUMENTS

| | | | | |
|---|---|---|---|---|
| 3,557,840 A | * | 1/1971 | Maybee | F16L 59/026 138/149 |
| 4,576,206 A | * | 3/1986 | Lauren | B32B 1/08 138/149 |
| 5,232,762 A | * | 8/1993 | Ruby | A47B 96/202 428/167 |

(Continued)

OTHER PUBLICATIONS

Thomas Fellinger, et al, Methods and Materials to Universally Fit Duct Liner Insulation for Oval HVAC Duct Systems, U.S. Appl. No. 16/001,177, filed Jun. 6, 2018.

*Primary Examiner* — Patrick F Brinson
(74) *Attorney, Agent, or Firm* — Robert D. Touslee

(57) ABSTRACT

The embodiments described herein relate generally to improved fit duct liner insulation for curvilinear ducts in HVAC, exhaust, or other similar gas flow systems. A duct liner insulation for a curvilinear duct may include an insulation board having a first major surface and a second major surface. The duct liner insulation further includes a plurality of rows of kerfs in the first major surface of the insulation board configured to allow the insulation board to flex in a direction of the width of the insulation board such that insulation board is foldable into a curvilinear configuration. Each of the kerfs has a v-shaped cross section with sidewalls extending from a kerf base portion at or near the second major surface of the insulation board to the first major surface of the insulation board. The sidewalls extending at an angle from 10 degrees to 20 degrees relative to each other.

23 Claims, 9 Drawing Sheets

(56) References Cited

U.S. PATENT DOCUMENTS

| | | | | |
|---|---|---|---|---|
| 5,310,594 A | * | 5/1994 | Holland | B29C 44/5654 |
| | | | | 428/167 |
| 5,567,504 A | * | 10/1996 | Schakel | B32B 3/30 |
| | | | | 428/167 |
| 5,697,282 A | | 12/1997 | Schakel et al. | |
| 5,762,109 A | | 6/1998 | Matthews et al. | |
| 5,855,154 A | | 1/1999 | Schakel et al. | |
| 5,953,818 A | * | 9/1999 | Matthews | B32B 3/30 |
| | | | | 29/890.144 |
| 6,000,437 A | * | 12/1999 | Ponder | F16L 59/026 |
| | | | | 138/128 |
| 6,148,867 A | * | 11/2000 | Matthews | B32B 3/30 |
| | | | | 138/149 |
| 6,457,237 B1 | * | 10/2002 | Matthews | B32B 3/30 |
| | | | | 29/890.144 |
| 8,142,879 B2 | * | 3/2012 | Whitaker | B29C 53/063 |
| | | | | 428/172 |
| 8,950,439 B2 | * | 2/2015 | Dudley | B32B 3/30 |
| | | | | 138/149 |
| 9,827,745 B2 | * | 11/2017 | Wardle | B32B 27/40 |
| 9,840,050 B2 | * | 12/2017 | Lanciaux | B29D 23/001 |

\* cited by examiner

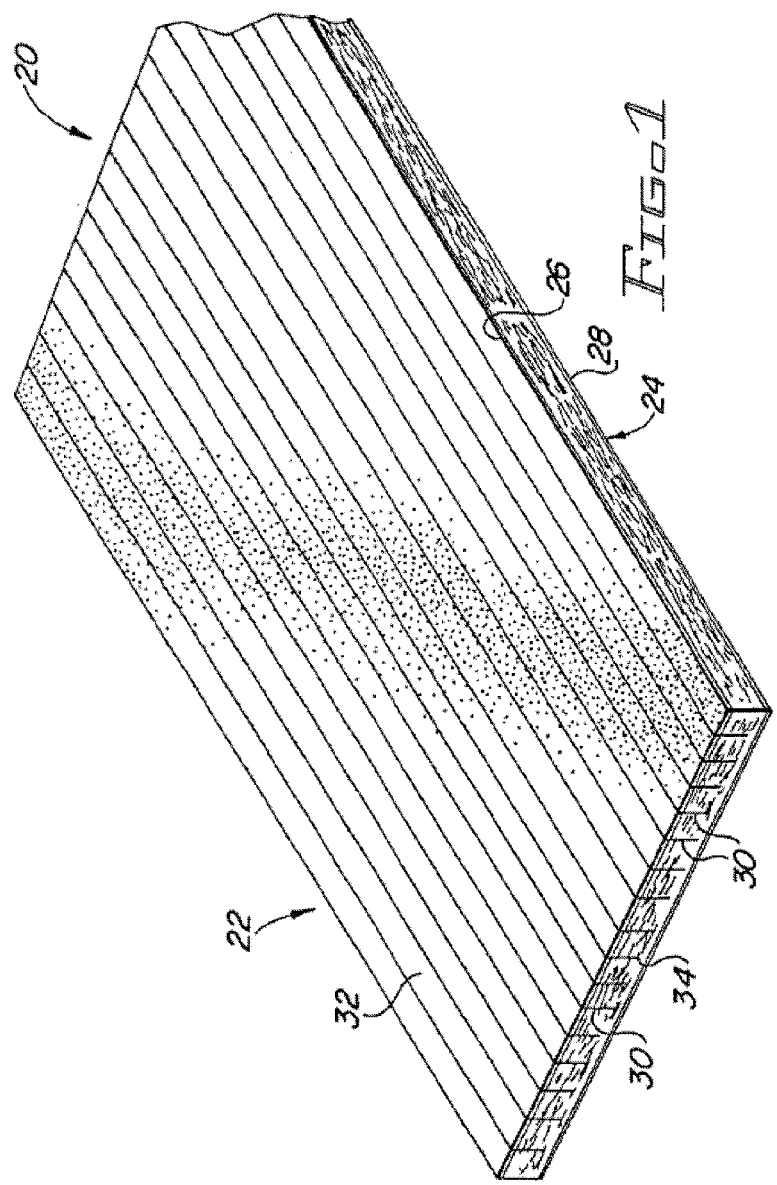

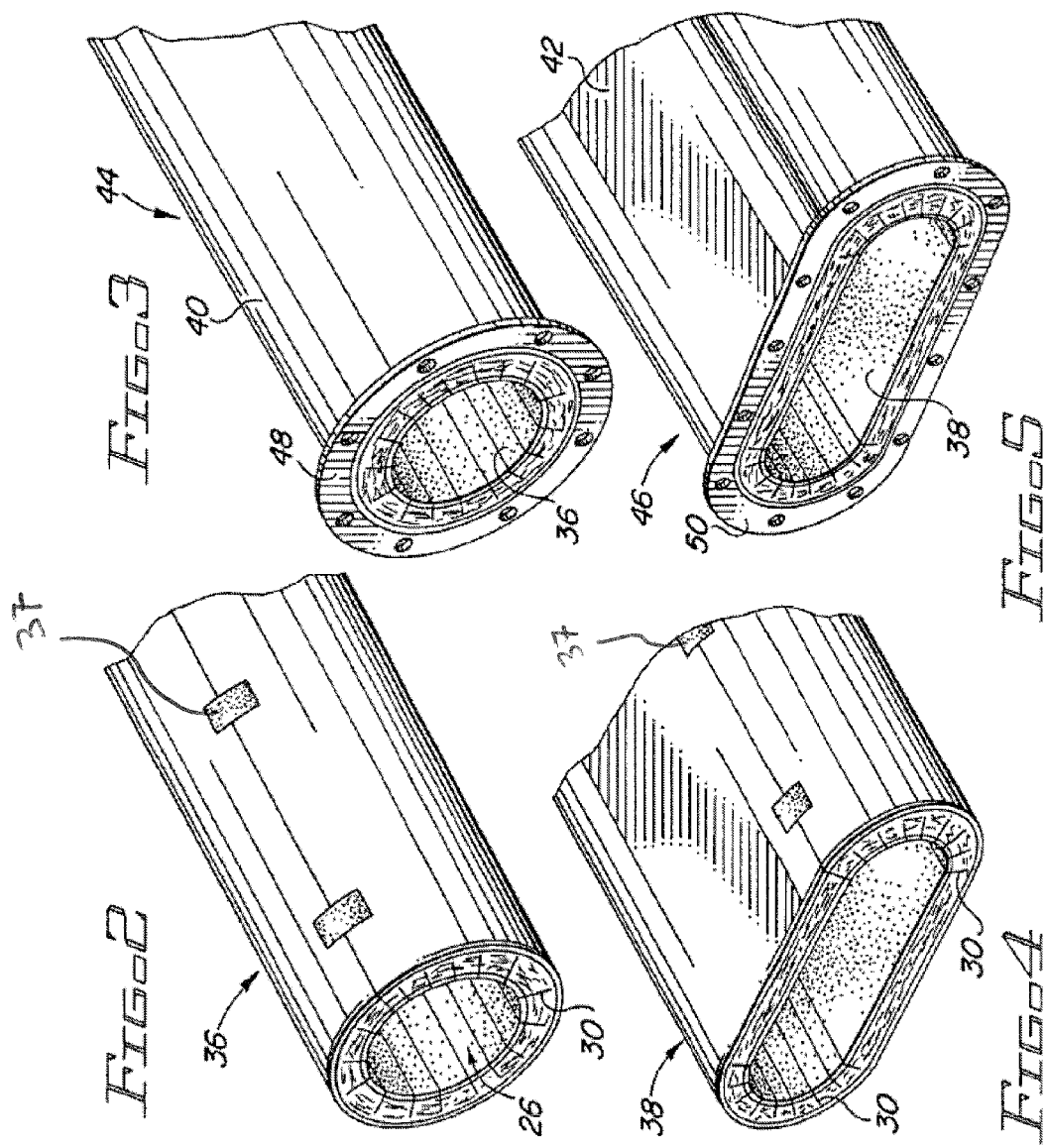

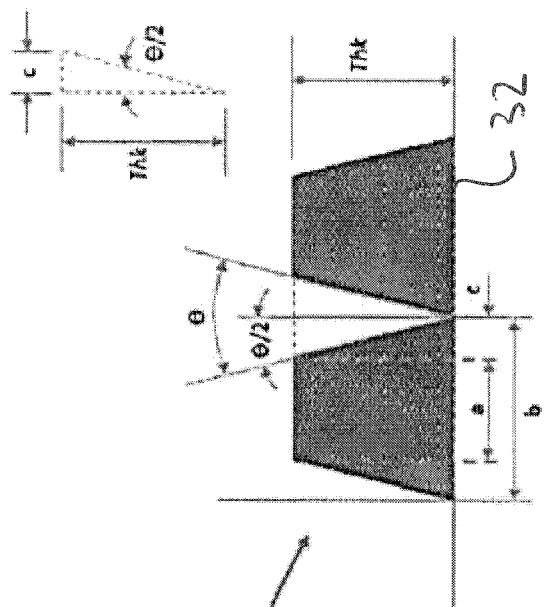
Figure 8D
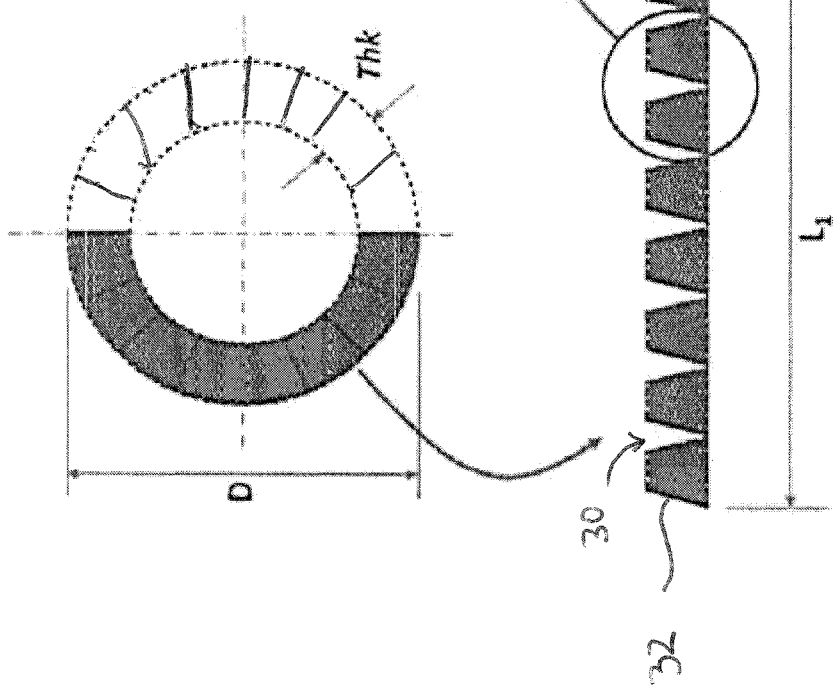
Figure 8A
Figure 8B
Figure 8C

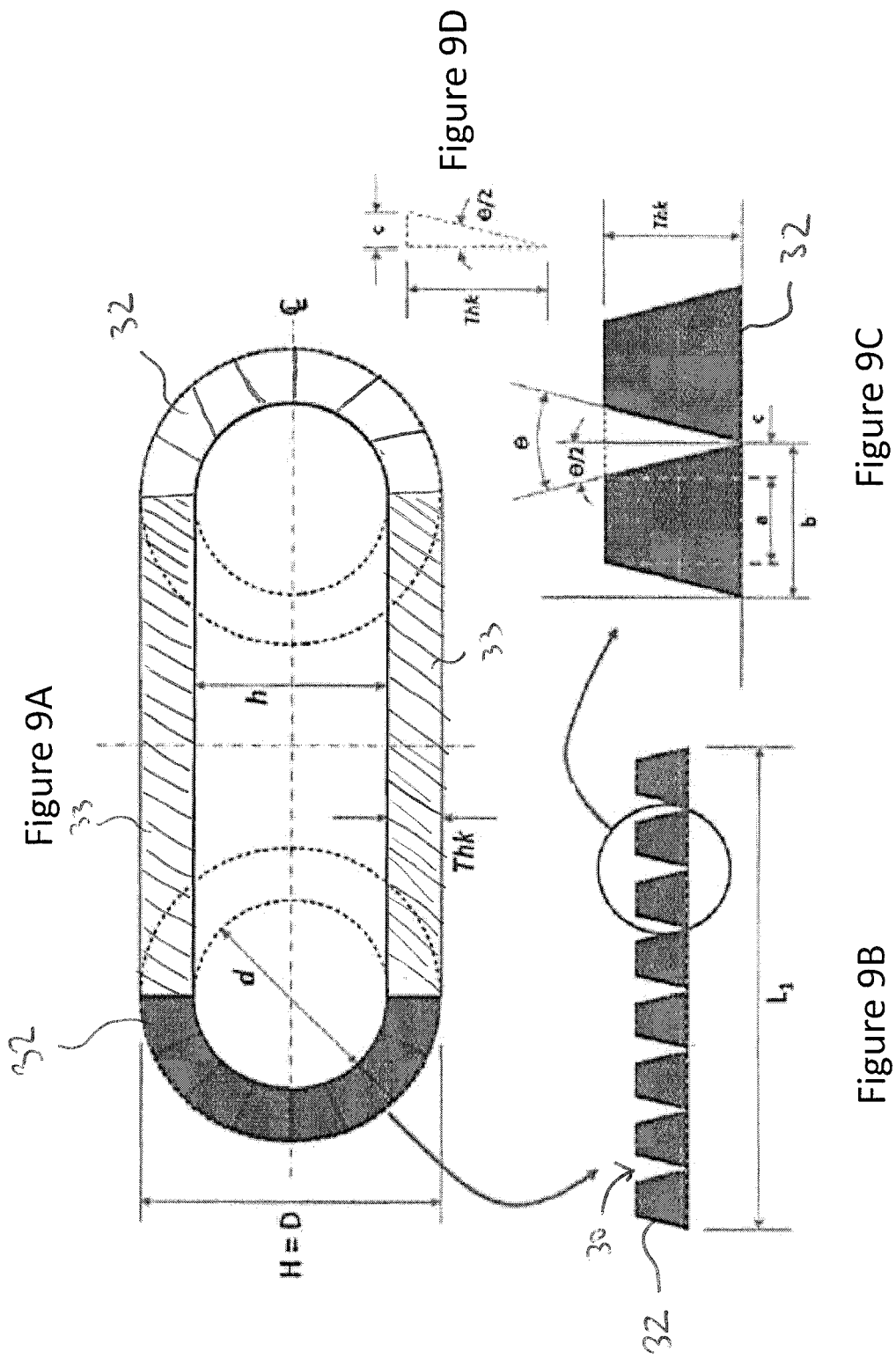

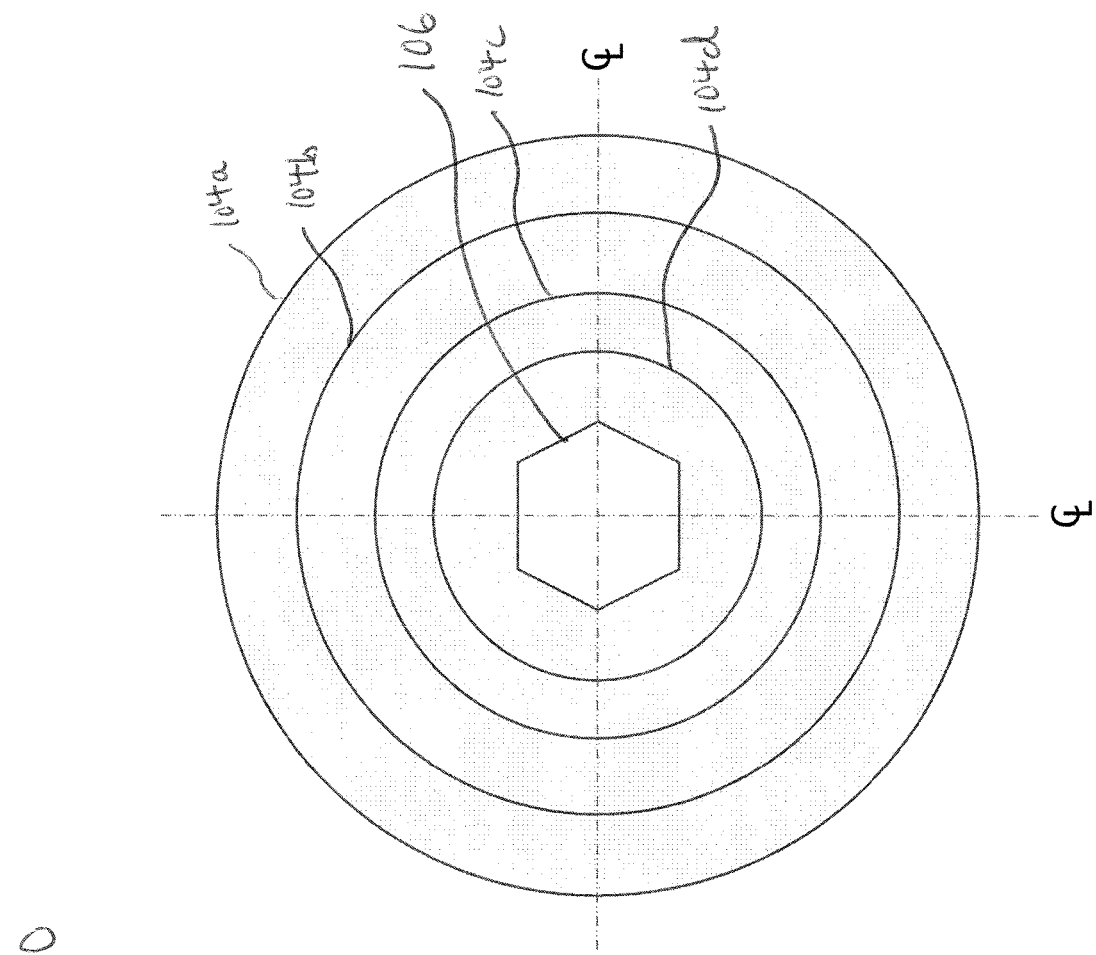
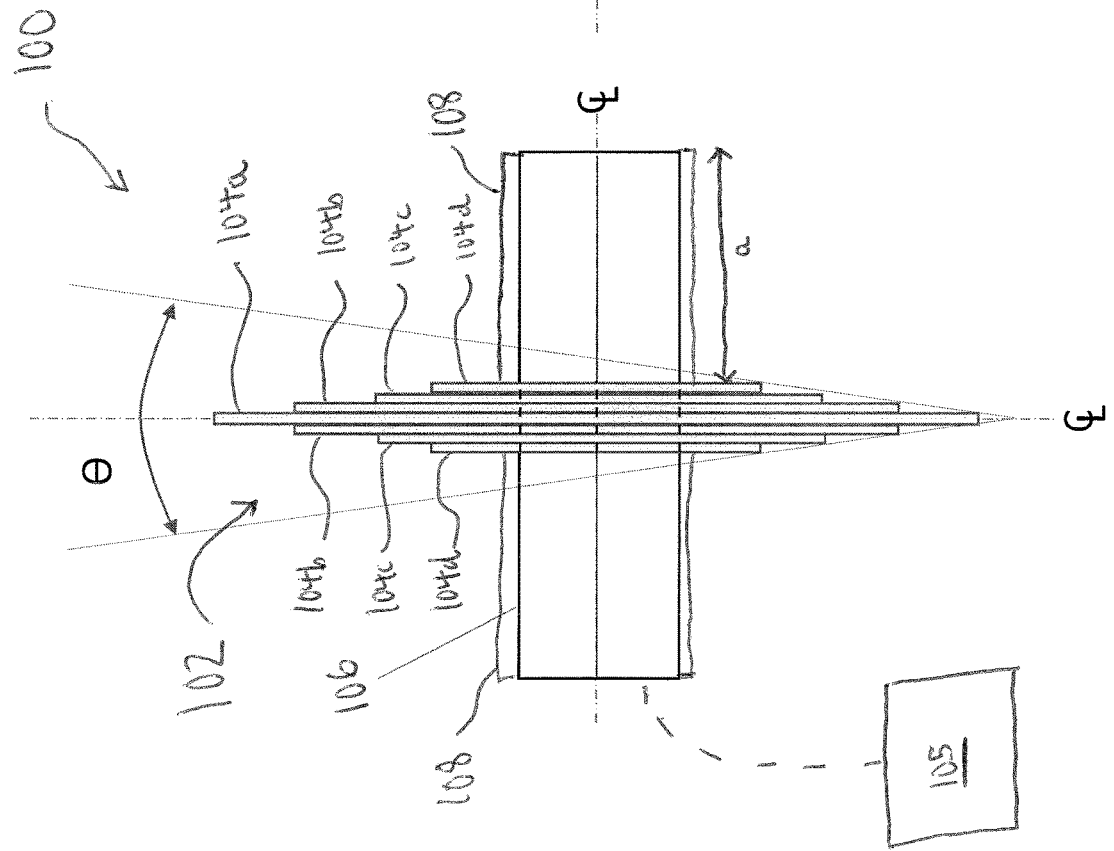
Figure 11A
Figure 11B

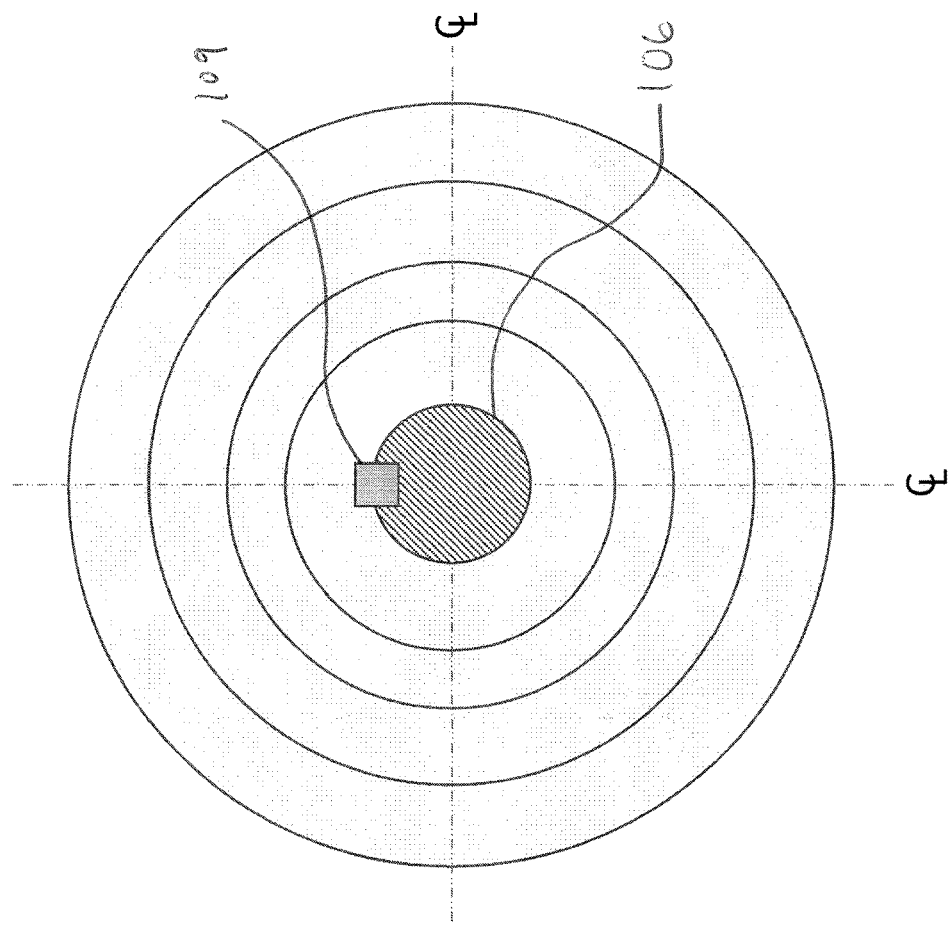
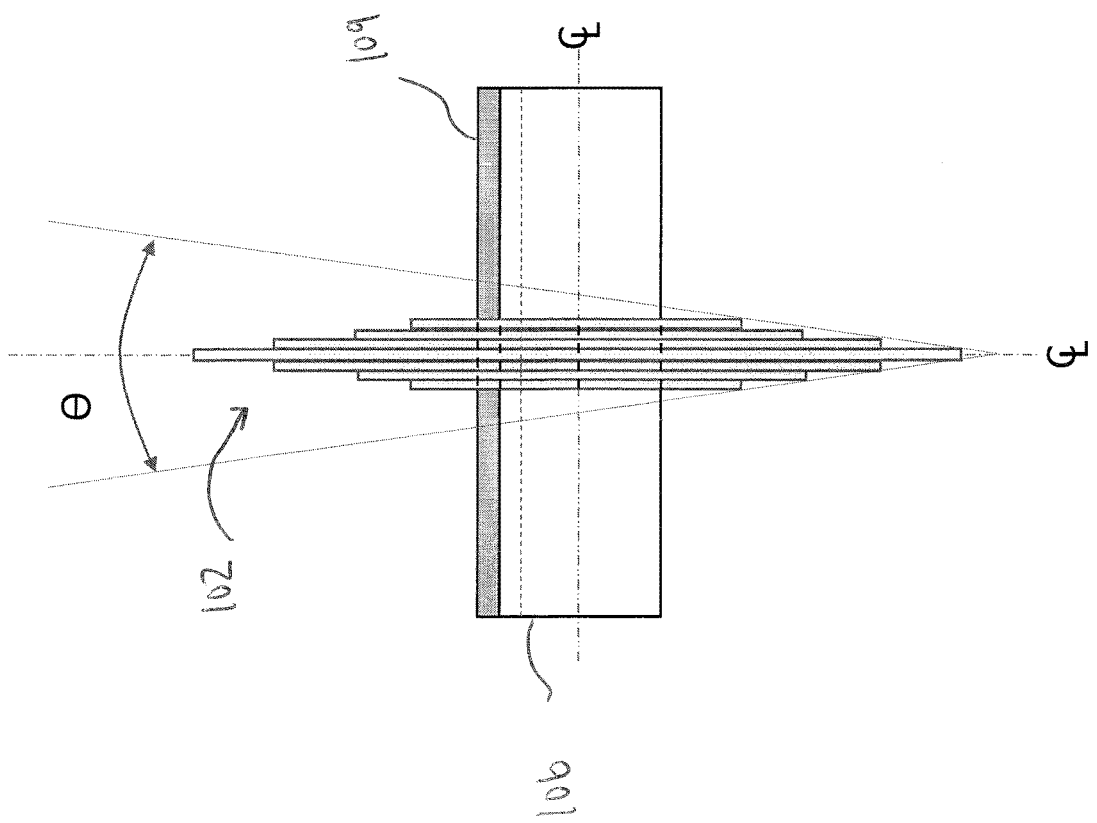
Figure 12A
Figure 12B

METHODS, MATERIALS, AND EQUIPMENT TO FORM IMPROVED FIT DUCT LINER INSULATION FOR ROUND AND OVAL HVAC DUCT SYSTEMS

BACKGROUND OF THE INVENTION

The present disclosure relates generally to duct liner insulation products for curvilinear ducts, and more specifically relates to methods, materials, and equipment to form improved fit duct liner insulation for round or oval ducts in, for example, heating, ventilating, and air conditioning (HVAC) systems. HVAC, exhaust, and other similar gas flow systems commonly found in a building structure may require insulated curvilinear (e.g., round or flat oval) air ducts for conveying conditioned air from air handling units to locations throughout the building structure, for returning air to the air handling units for heating, cooling, or recirculation, or for conveying other gases such as exhaust gases. Ducts of such systems are generally lined with rigid or semi-rigid duct liner insulation. Such duct liner insulation may control or attenuate acoustical or thermal transmissions within and through the systems to reduce transmitted noise and conserve energy.

A current industry solution for insulating curvilinear (e.g., round or oval) ducts includes lining such ducts with rigid or semi-rigid insulation board liners which have rows of parallel kerfs (e.g., grooves) extending along their gas stream surfaces. The kerfs allow the insulation board liners to be curved or bent about an axis parallel to the kerfs into tubular shapes to line such curvilinear ducts. However, difficulty remains in properly fitting the insulation liners to ducts of particular curvilinear cross sections or sizes such that the liners conform properly or extend in a substantial uniform manner around the inner periphery of the ducts. For example, potential delamination, gap, and fit issues or issues with bending the insulation board (e.g., difficulty in bending) may arise. Openings or gaps between kerfs after installation within the ducts may expose uncoated fibers to the gas stream which may dislodge such fibers as air or other gases flow therethrough. Additionally, in relatively small diameter curvilinear ducts (e.g., 10 inches or smaller, 12 inches or smaller), the kerfed insulation board liners may have an undesired "blocky" appearance when installed. In flat oval ducts, sagging of such insulation from the upper flat portion of such flat oval ducts, as well as exposed uncoated fibers to the gas stream may arise from liners with continuous kerfing. Further, gaps between kerfs or delamination of insulation materials may occur, if for example, the insulation board liner is bent too aggressively to close such gaps to line the flat oval duct. Therefore, there remains a need for methods, materials, and equipment to form improved fit (e.g., uniform, conformity) duct liner insulation for curvilinear ducts including round or flat oval ducts. In particular, there remains a need for improved fit duct liner insulation for small diameter round or flat oval ducts that are less costly to manufacture or install, or reduce or prevent potential delamination, sagging, gap, or fit issues (e.g., blocky appearance, uniform or conformity issues) or issues with bending the insulation board.

BRIEF SUMMARY OF THE INVENTION

The embodiments described herein relate generally to duct liner insulation products for curvilinear ducts, and more specifically relate to methods, materials, and equipment to form improved fit duct liner insulation for round or oval ducts in HVAC, exhaust, or other similar gas flow systems. In particular, certain embodiments of the duct liner insulation may include kerfed duct liner insulation with improved conformity or uniformity in lining or fitting small diameter (e.g., 10 inches or less or 12 inches or less) curvilinear ducts (e.g., round or oval ducts). In other embodiments, duct liner insulation may include segments or sections with and without kerfing for flat oval ducts. The methods, materials, and equipment described herein may provide improved fit duct liner insulation for round or flat oval ducts. For example, improved duct liner insulation as described herein may reduce or prevent potential delamination, gap, and fit issues (e.g., uniform or conformity issues) or issues with bending the insulation that may arise with other kerfed insulation products. The duct liner insulation described herein may provide a less "blocky" appearance by improving conformity with an inner periphery of a small diameter curvilinear duct when installed. In certain embodiments, the duct liner insulation with segments or sections with and without kerfing described herein may be less susceptible to sagging, exposed fibers, kerf gaps, or delamination when installed within flat oval ducts.

According to a first aspect, a duct liner insulation for a curvilinear duct is provided that includes an insulation board having a first major surface and a second major surface, wherein the first major surface is configured to be a gas stream surface and the second major surface is configured to extend around an inner periphery of a curvilinear duct when the insulation board is installed within the curvilinear duct. The insulation board has a length, width, and thickness. The duct liner insulation further includes a plurality of rows of kerfs in the first major surface of the insulation board configured to allow the insulation board to flex in a direction of the width of the insulation board such that insulation board is foldable into a curvilinear configuration. The insulation board has a cross sectional configuration substantially mirroring a cross sectional configuration of the inner periphery of the curvilinear duct when installed. Each of the kerfs has a v-shaped cross section with sidewalls extending from a kerf base portion at or near the second major surface of the insulation board to the first major surface of the insulation board, the sidewalls extending at an angle from 10 degrees to 20 degrees relative to each other.

In some embodiments, a first row of kerfs of the plurality of rows of kerfs is formed between first and second kerfed segments, the first and second kerfed segments having trapezoidal cross sectional configurations. Each of the first and second kerfed segments having an upper base width (a) and a lower base width (b). The lower base width (b) may range from 0.6 inches to 1.6 inches. The lower base width (b) may range from 0.6 inches to 1.0 inches. The sidewalls may extend at an angle from 13 degrees to 17 degrees relative to each other. The sidewalls may extend at an angle from 14 degrees to 16 degrees relative to each other.

In some embodiments, the first major surface or the second major surface include a facing. The thickness of the insulation board may range from 1 inches to 3 inches. In certain embodiments, a depth of the kerfs does not penetrate the second major surface. In some embodiments, the curvilinear duct is a round duct. The round duct may have a diameter from 6 inches to 12 inches.

In some embodiments, the curvilinear duct is a flat oval duct. The flat oval duct may have a height from 6 inches to 12 inches. In certain embodiments, the insulation board may include both kerfed segments and unkerfed segments. The kerfed segments are configured to line round portions of the flat oval duct and the unkerfed segments are configured to line flat portions of the flat oval duct when the insulation board is installed. The kerfed and unkerfed segments may be monolithically formed. In other embodiments, the kerfed and unkerfed segments are separately formed and configured to be joined together to be installed within the flat oval duct.

According to another aspect, a kerfing apparatus configured to kerf duct liner insulation for a curvilinear duct is provided. The kerfing apparatus includes at least one of a tapered router bit operably coupled to a CNC milling machine or a plurality of sets of stacked saw blades coupled to a rotatable shaft. Each set of stacked saw blades of the plurality of sets of stacked saw blades includes an odd number of saw blades. The at least one of the tapered router bit or the plurality of sets of stacked saw blades are configured to cut a plurality of rows of kerfs having v-shaped cross sectional configurations in an insulation board. The rows of kerfs are configured to allow the insulation board to flex in a direction of the width of the insulation board such that insulation board is foldable into a curvilinear configuration to line the curvilinear duct when installed. Each of the kerfs of the plurality of rows of kerfs have sidewalls extending from a kerf base portion at or near a second major surface of the insulation board to a first major surface of the insulation board. The sidewalls extend at an angle from 10 degrees to 20 degrees relative to each other In certain embodiments, each set of stacked saw blades includes at least three saw blades including a first saw blade with second and third saw blades stacked on opposing sides of the first saw blade. The first saw blade has a diameter greater than diameters of the second and third saw blades. The diameters of the second and third saw blades are equal.

In certain embodiments, a smallest diameter saw blade of each set of the stacked saw blades is at least 1 inch greater in diameter than a diameter of the rotatable shaft. In some embodiments, the kerfing apparatus further includes one or more spacers coupled to the rotatable shaft between at least two sets of stacked saw blades. The curvilinear duct includes a flat oval duct with flat portions and round portions, and the one or more spacers have widths substantially equal to a width of the flat portions of the flat oval duct.

According to another aspect, a method of kerfing duct liner insulation for a curvilinear duct is provided. The method includes cutting a plurality of rows of kerfs having v-shaped cross sectional configurations in an insulation board, the rows of kerfs configured to allow the insulation board to flex in a direction of the width of the insulation board such that insulation board is foldable into a curvilinear configuration to line the curvilinear duct when installed. Each of the kerfs of the plurality of rows of kerfs have sidewalls extending from a kerf base portion at or near a second major surface of the insulation board to a first major surface of the insulation board, the sidewalls extending at an angle from 10 degrees to 20 degrees relative to each other.

In some embodiments, the method further includes cutting the plurality of rows of kerfs with at least one tapered router bit operably coupled to a CNC milling machine. In other embodiments, the method further includes cutting the plurality of rows of kerfs with a corresponding plurality of sets of stacked saw blades coupled to a rotatable shaft, wherein each set of stacked saw blades of the plurality of sets of stacked saw blades includes an odd number of saw blades. Each set of stacked saw blades may include at least three saw blades including a first saw blade with second and third saw blades stacked on opposing sides of the first saw blade. The first saw blade has a diameter greater than diameters of the second and third saw blades, and diameters of the second and third saw blades are equal. A smallest diameter saw blade of each set of the stacked saw blades is at least 1 inch greater in diameter than a diameter of the rotatable shaft.

In some embodiments, cutting the plurality of rows of kerfs includes cutting a first row of kerfs such that first and second kerfed segments are formed on each side of the first row of kerfs. The first and second kerfed segments have trapezoidal cross sectional configurations, and wherein each of the first and second kerfed segments have an upper base width (a) and a lower base width (b). In some embodiments, one or more spacers are coupled to the rotatable shaft between at least two sets of stacked saw blades, the one or more spacers having a width substantially equal to the upper base width (a). The lower base width (b) may range from 0.6 inches to 1.6 inches. The lower base width (b) may range from 0.6 inches to 1.0 inches.

In some embodiments, the sidewalls extend at an angle from 13 degrees to 17 degrees relative to each other. In other embodiments, the sidewalls extend at an angle from 14 degrees to 16 degrees relative to each other. In certain embodiments, a depth of each of the kerfs does not penetrate the second major surface.

In some embodiments, the curvilinear duct is a flat oval duct with flat portions and round portions and the insulation board comprises kerfed segments and unkerfed segments. The kerfed segments are configured to line the round portions of the flat oval duct and the unkerfed segments are configured to line flat portions of the flat oval duct when the insulation board is installed within the curvilinear duct. One or more spacers may be coupled to the rotatable shaft between at least two sets of stacked saw blades, the one or more spacers having a width substantially equal to a width of the flat portions of the curvilinear duct.

BRIEF DESCRIPTION OF THE DRAWINGS

FIG. 1 is a perspective view of an insulation board for duct liner insulation with a kerfed gas stream surface in accordance with an exemplary embodiment of the present disclosure.

FIG. 2 illustrates duct liner insulation with a round cross sectional configuration formed from the kerfed insulation board of FIG. 1 in accordance with an exemplary embodiment of the present disclosure.

FIG. 3 illustrates the duct liner insulation of FIG. 2 installed within a round duct in accordance with exemplary embodiments of the present disclosure.

FIG. 4 illustrates duct liner insulation with a flat oval cross sectional configuration formed from the kerfed insulation board of FIG. 1 in accordance with another exemplary embodiment of the present disclosure.

FIG. 5 illustrates the duct liner insulation of FIG. 4 installed within a flat oval duct in accordance with exemplary embodiments of the present disclosure

FIGS. 8A-8D are various views of an improved kerfed insulation board for fitting a round duct in accordance with an exemplary embodiment of the present disclosure.

FIGS. 9A-9D are various views of an improved kerfed insulation board for fitting a flat oval duct in accordance with another exemplary embodiment of the present disclosure.

FIGS. 11A-11B are front and side views, respectively, of a portion of a stacked circular saw blade apparatus for kerfing insulation boards in accordance with another exemplary embodiment of the present disclosure.

FIGS. 12A-12B are front and side views, respectively, the stacked circular saw blade apparatus of FIGS. 11A-11B with a keyed rotatable shaft in accordance with another exemplary embodiment of the present disclosure.

DETAILED DESCRIPTION OF THE INVENTION

Figure 6B:
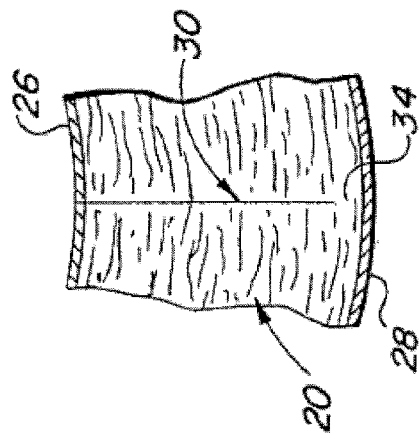
FIG. 6B is a close up view of the portion of the v-shaped kerf and kerfed segments of the insulation board of FIG. 1 when the duct liner insulation board is formed into a curvilinear shaped in accordance with an exemplary embodiment of the present disclosure.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

"ASTM" refers to American Society for Testing and Materials and is used to identify a test method by number. The year of the test method is either identified by suffix following the test number or is the most recent test method prior to the priority date of this document.

The embodiments described herein and illustrated in FIGS. 1-13B relate generally to duct liner insulation products for curvilinear ducts, and more specifically relate to methods, materials, and equipment to form improved fit duct liner insulation for round or oval ducts in HVAC, exhaust, or other similar gas flow systems. With reference to FIGS. 1-5, a duct liner insulation 10 as described herein includes an insulation board 20. The duct liner insulation 10 may also be configured as a blanket, mat, batt, sheet, or roll. The duct liner insulation 10 may be installed within (e.g., line) a curvilinear duct, for example, a round duct 40 (FIG. 3) or a flat oval duct 42 (FIG. 5). The insulation board 20 may be semi-rigid or rigid insulation board made of fibrous material, cellular foam, mineral wool, or a composite of such materials. The insulation board 20 may have a rectangular cross sectional configuration when in an unfolded, unbent, or uninstalled configuration as illustrated in FIG. 1. In other embodiments, the insulation board may have another suitable cross sectional configuration. The insulation board 20 mirrors or has substantially the same cross sectional configuration as the curvilinear duct when lining the curvilinear duct in the folded, bent, or installed configuration (e.g., round or circular in FIG. 3 and flat oval in FIG. 5).

The insulation board 20 includes a first major surface 22 (e.g., top surface) which is a gas stream or interior surface and a second major surface 24 (e.g., bottom surface) which is an outside surface. In certain embodiments, the gas stream surface 22 of the insulation board may be untreated as an additional cost savings. However, in other embodiments, the gas stream surface 22 has a coating or facing 26 covering the gas stream surface, such as but not limited to, a polymeric coating, a non-combustible foil facing, a synthetic polymer film, a metallic foil composite or a treated, non-woven mat (e.g. a polyester mat coated with a polymeric coating). The outside surface 24 of the insulation board 20 may be provided with a moisture barrier facing 28, such as but not limited to a foil-scrim-kraft facing.

As shown in FIG. 1, the gas stream surface 22 of the insulation board 20 is provided with a plurality of kerfs 30 (e.g., rows of kerfs 30). The kerfs 30 (e.g., grooves, openings) extend the length of the insulation board and are spaced and extend parallel with respect to each other. In other embodiments, the kerfs 30 may extend the width of the insulation board and are spaced and extend parallel with respect to each other. The kerfing of the insulation board 20 forms a plurality of longitudinally extending kerfed segments 32 which are hinged together by the hinge portions 34 of the insulation boards intermediate the bottoms of the kerfs 30 and the outside surfaces 24 of the insulation boards plus the facings 28 on the outside surfaces of the insulation boards. Preferably, the bottom of the kerfs 30 are at or proximate the bottom of the outside surface 24 (e.g., without penetrating the outside surface or extending into the facing 28) such that the hinge portions 34 are relatively small. For example, bottoms of the kerfs may be positioned from or extend to within $\frac{1}{16}$" to $\frac{1}{8}$" of the bottom of the outside surface 24. In this manner, the kerfs 30 extend through substantially the entire thickness of the insulation board 20. Depths of the kerfs 30 may range from 85% to 95% of the thickness of the insulation board 20. Thus, for a 2 inch thick insulation board as an example, the hinge portions 34 may range from 0.1 inches to 0.3 inches in depth. In other embodiments, depths of the kerfs 30 may be up to 91%, 92%, 93%, 94%, 95%, 96%, 97%, 98%, or 99%, or any value therebetween of the thickness of the insulation board 20. In some embodiments, the depths of the kerfs 30 may be greater than 90% of the thickness of the insulation board 20 but less than 100%. As used herein, the dimension of the insulation board 20 parallel to the kerfs is defined as the length of the insulation board 20 and the dimension of the insulation board perpendicular to the kerfs is defined as the width of the insulation boards. Preferably, the kerfs 30 are formed with desired dimensions by a plurality of appropriately spaced and driven tapered end mill bits or sets of stacked steel, ceramic or carbide saw blades of various diameters as described in more detail below with respect to FIGS. 10-12B.

The kerfing of the insulation board 20 allows the insulation board to be folded, bent, or curved in the direction of its width (e.g., when the kerfs 30 extend along the length of the insulation board) to enable the insulation board to be formed into the curvilinear shape of a duct to line the duct. In other embodiments, the kerfing allows the insulation board to be folded, bent, or curved in the direction of its length (e.g., when the kerfs 30 extend along the width of the insulation board). The kerfs 30 cannot be placed too close together (e.g., with kerfs 30 too wide or kerfed segments 32 too narrow) or the insulation material of the insulation board in the longitudinal kerfed segments 32 may lose its integrity or the insulation board 20 may fall apart. Further, if the kerfs 30 are too wide, gaps may result when the insulation board is installed exposing fibers or other particles to the gas stream. If the kerfs 30 are spaced too far apart (e.g., with kerfs 30 too narrow or kerfed segments 32 too wide), the insulation board 20 may not have the flexibility in the direction of its width to enable the insulation board to be bent and curved into a curvilinear shape of the desired dimensions when installed (e.g., may appear block-like). Therefore, as described in more detail below (FIGS. 8A-9D), size or dimensions (e.g., depth, thickness, width, length), spacing, angle, or number of kerfs 30 or kerfed segments 32 may be pre-selected or determined to improve fit (e.g., conformity or uniformity) within a curvilinear duct or reduce or eliminate potential delamination, kerf gap, sagging, or other fit issues or issues with bending the insulation board 20. In particular, kerfing of the duct liner insulation 10 may be improved for small diameter (e.g., 10 inches or less) round ducts or flat oval ducts.

As shown in FIGS. 2 and 4, after the insulation board 20 has been formed (e.g., bent, folded, curved) into a round and flat oval duct liners, respectively, the lateral edges of the insulation board may be secured together with tape 37, glue, or other suitable fasteners or adhesives so that the insulation board will remain in its curvilinear (e.g., round or flat oval) cross sectional configuration. The insulation board 20 may then be inserted into the round or flat oval ducts 40 or 42 to form the duct liner insulation 10, as illustrated in FIGS. 3 and 5, respectively. The insulation board 20 may be further adhered to the ducts when installed (e.g., with glue or other adhesive) once installed in certain embodiments. The round and flat oval ducts 40 and 42 used in the present invention are typically conventional tubular shells commonly used for industrial and commercial applications. The round or flat oval ducts 40 and 42 are typically made of spirally wound sheet metal strips with adjacent convolutions of the metal strips joined by a conventional spiral seam. Multiple ducts may be joined together by male/female connectors; sleeves; or outer flanges, such as the flanges 48 and 50 shown in FIGS. 3 and 5; or other conventional means.

Figure 6A:
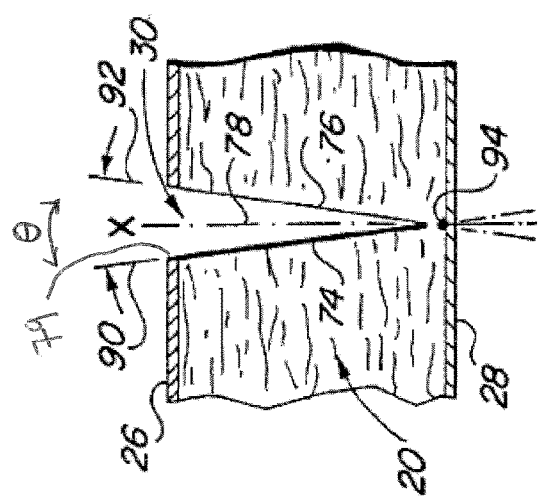
FIG. 6A is a close up view of a portion of a v-shaped kerf and kerfed segments of the insulation board of FIG. 1

As shown in FIGS. 6A and 6B, each of the kerfs 30 may have v-shaped transverse cross sections with sidewalls 74 and 76 which meet at the base or bottom of the kerf 30 and extend to the gas stream surface of the insulation board 20. The sidewalls diverge with respect to each other and a plane 78, extending perpendicular to the gas stream surface 22 of the insulation board 20 and bisecting the kerf 30 along a longitudinal centerline of the kerf 30, from the base of the kerf 30 to the gas stream surface 22 of the insulation board 20. The kerf 30 has shoulders 79 adjoining the gas stream surface 22 of the insulation board 20. When the insulation board 20 is folded, bent, or formed into a curvilinear configuration to form a duct liner as shown in FIG. 6A, the shoulders 79 of the kerf 30, adjoining the gas stream surface 22 of the insulation board 20, come together (e.g., abut) and the sidewalls 74 and 76 abut along their surfaces so that no or substantially no air space is formed in the wall of the duct liner insulation 10. The widths of the openings of the kerfs 30 of the present invention may be defined by a pair of planes 90 and 92 which extend from a common vertex point 94 (e.g., at non-perpendicular angles relative to the first and second major surfaces), located at or proximate the second major surface 24 of insulation board in the plane 78 bisecting the kerf 30 through the junctures of the kerf sidewalls with the gas stream surface 22, as shown in FIGS. 6A and 7A. Preferably, as discussed above, the base of the kerfs 30 is positioned at or proximate to the point 94 (e.g., such that the kerfs 30 do not extend into the facing 28 or penetrate through the second major surface 24). As described in more detail below (FIGS. 8A-9D), in some embodiments, the included angle θ between the sidewalls or planes may be selected, or have a value within a range for improved fitting or lining of a curvilinear duct.

In some embodiments, the kerfs 30 are formed so that the shoulders 79 not only abut when the insulation board 20 is bent into a desired curvilinear configuration of preselected dimensions, but the shoulders are pressed together, when the insulation board has been formed into the desired curvilinear configuration, with sufficient force to compress the insulation material in the shoulders 79 so that the curvilinear configuration of the duct liner insulation formed from the insulation board 20 is retained after the insulation board has been formed into the duct liner (FIGS. 2 and 4) or installed within the ducts (FIGS. 3 and 5). The kerfs 30 are formed so that the insulation material in the sidewalls, for the entire or substantially the entire depth of the kerf, are subjected to compression when the insulation board 20 is bent into the curvilinear cross sectional configuration of the preselected dimensions to further rigidify the duct liner formed from the insulation board 20.

Figure 7B:
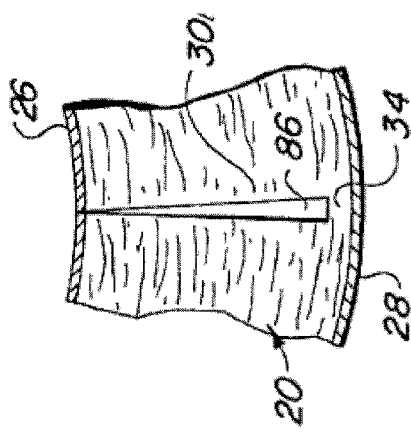
FIG. 7B is a close up view of the portion of the substantially v-shaped kerf and kerfed segments of the insulation board of FIG. 1 when the duct liner insulation board is formed into a curvilinear shaped in accordance with another exemplary embodiment of the present disclosure.
Figure 7A:
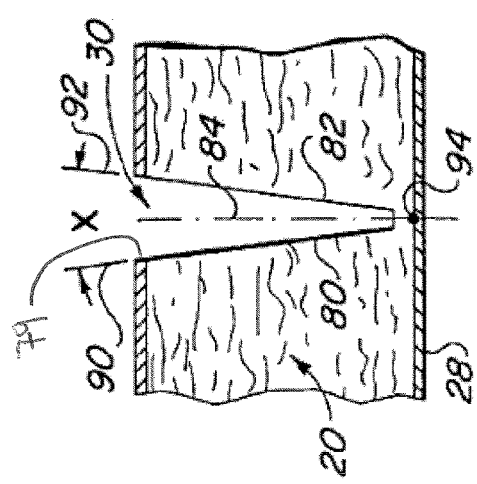
FIG. 7A is a close up view of a portion of a substantially v-shaped kerf and kerfed segments of the insulation board of FIG. 1
Figure 10:
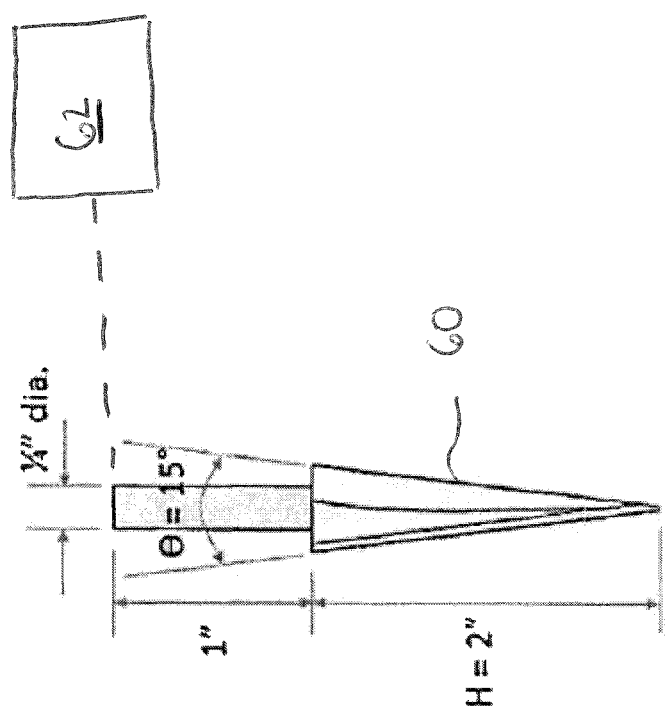
FIG. 10 is a side view of a tapered router bit for kerfing insulation boards in accordance with an exemplary embodiment of the present disclosure.

In other embodiments, as shown in FIGS. 7A and 7B, each of the kerfs 30 may have v-shaped transverse cross sections with sidewalls 80 and 82 which extend from a base or bottom of the kerf 30 to the gas stream surface 22 of the insulation board 20, similar to the kerfs illustrated in FIGS. 6A-6B. However, the sidewalls 80 and 82 of kerf 30 do not meet at the base of the kerf. Instead the sidewalls 80 and 82 are narrowly spaced from each other at the base of the kerf 30 and diverge with respect to each other and a plane 84, extending perpendicular to the gas stream surface 22 of the insulation board 20 and bisecting the kerf 30 along the longitudinal centerline of the kerf 30, from the base of the kerf 30 to the gas stream surface 22 of the insulation board 20. The kerf 30 has shoulders 85 adjoining the gas stream surface 22 of the insulation board. When the insulation board 20 is bent or formed into a curvilinear configuration to form a duct liner as shown in FIG. 7A, the shoulders 85 of the kerf, adjoining the gas stream surface 22 of the insulation board 20, come together and a very narrow air space 86 is formed in the wall of the duct or duct liner at the bottom of the kerf 30.

As noted above, one or more of size or dimensions (e.g., depth, thickness, width, length), spacing, angle, or number of kerfs 30 or kerfed segments 32 may be pre-selected or determined to improve fit within a curvilinear duct or reduce or eliminate potential delamination, kerf gap, or fit issues or issues with bending the insulation board 20. In particular, kerfing of the duct liner insulation 10 may be improved for better fitting or lining small diameter (e.g., 10 inches or less or 12 inches or less) curvilinear ducts. For example, kerfing of liners may be improved for 6-12 inch (e.g., 6, 8, 10, or 12 inch) diameter curvilinear ducts as described herein. In other embodiments, improved kerfing may be provided for curvilinear ducts having diameters of 12 inches or more (e.g., 12 inches, 14 inches, 16 inches, 18 inches, 20 inches, up to 30 inches, up to 100 inches).

With reference to FIGS. 8A-9D, kerfing of the duct liner insulation 10 may be Improved for curvilinear ducts, and in particular, small diameter round ducts (FIGS. 8A-8D) or flat oval ducts (FIGS. 9A-9D), In some embodiments, at least one of the width (e.g., bottom or top widths—(b), (a)) of the kerfed segments 32, number (n) of kerfed segments 32, thickness (Thk), outer diameter (D) or outer circumference (L1), width (c) of kerfs 30, or the angle between the two planes of the openings of kerfs 30 of the insulation board 20 may be selected or pre-determined to improve fit of the duct liner insulation 10 for a curvilinear duct such that the Insulation 10 conforms better to the inner periphery of the duct or extends in a more substantially uniform manner. For example, the number (n) of kerfed segments 32 may be pre-determined; adjusted, specified, or selected based on or for an insulation board 20 with a set or given thickness (Thk) and outer diameter (D) or outer circumference (L1) such that the angle between the two planes of the openings of kerfs 30 or the bottom width (b) of the kerfed segments 32 are within ranges to better or improve fit (e.g., conformity or uniformity) within a round duct as described in more detail below.

In other embodiments, the thickness (Thk) may be pre-determined, adjusted, specified, or selected based on or for an insulation board 20 with a set or given number (n) of kerfed segments 32 and outer diameter (D) or outer circumference (L1) such that the angle θ between the two planes of the openings of kerfs 30 and the bottom width (b) of the kerfed segments 32 are within ranges for improved fitting or lining of a round duct. In yet further embodiments, outer diameter (D) or outer circumference (L1) may be pre-determined, adjusted, specified, or selected based on or for an insulation board 20 with a set or given thickness (Thk) and number (n) of kerfed segments 32 such that the angle θ between the two planes of the openings of kerfs 30 and the bottom width (b) of the kerfed segments 32 are within ranges for improved fitting or lining of a round duct. Therefore, when two of three variables of, for example: number of kerfed segments 32, thickness (Thk), and outer diameter (D) or outer circumference (L1) are fixed, set, or known depending on a diameter of the duct to be lined, the other or third variable may be adjusted, selected, or determined such that the angle θ between the two planes of the openings of kerfs 30 or the bottom width (b) of the kerfed segments 32 are within ranges to provide improved fitting or lining of the duct.

Typically, the insulation board 20 for duct liner insulation 10 as described herein has a thickness (Thk) ranging from 1 inch to 4 inches (e.g., in increments of a ½ inch). The insulation board 20 may have a thickness (Thk) in a range of 0.5 inches to 3.0 inches, 0.5 inches to 2.5 inches, 0.5 inches to 2 inches, 1 inch to 3 inches, 1 inch to 2.5 inches, or 1 inch to 2 inches, or any value therebetween. An insulation board 20 with a desired thickness may be selected depending on the application or insulating properties. The outer diameter (D) or outer circumference (L1) of the insulation board 20 generally mirrors or is substantially equal to that of the inner diameter or circumference of the round duct to be fitted or lined. The outer circumference (L1) or width of the insulation board 20 required (e.g., to be cut) may then be determined based on the outer diameter (D) of the insulation board (e.g., inner diameter or circumference of the round duct to be fitted or lined). Therefore, for small round ducts, the outer diameter (D) may range or be selected within a range, for example, from 6 inches to 10 inches depending on the inner diameter of the duct to be lined and the width or outer circumference (L1) of the insulation board 20 required may be determined accordingly. For improving fit or conformity within a round duct, the angle θ between the two planes of the openings of kerfs 30 typically ranges from 10° to 20°, 11° to 19°, 12° to 18°, 13° to 17°, 14° to 16°, or any value therebetween (e.g., 15°). The bottom or lower base width (b) of the kerfed segments 32 (e.g., spacing between kerfs 30 on centers) generally ranges from 0.60 inches to 1.60 inches, 0.65 inches to 1.60 inches, 0.70 inches to 1.55 inches, 0.75 inches to 1.50 inches, 0.60 inches to 1.00 inches, 0.75 inches to 1.00 inches, 0.80 inches to 1.00 inches, 0.90 inches to 1.00 inches, 0.80 inches to 1.45 inches, 0.85 inches, to 1.40 inches, or any value therebetween (e.g., 1 inch). The top or upper base width (a) of the kerfed segments generally ranges from 0.45 inches to 0.85 inches, 0.50 inches to 0.80 inches, 0.50 inches to 0.75 inches, 0.50 inches to 0.70 inches, 0.50 inches to 0.60 inches, or any value therebetween (e.g., 0.5 inches). As illustrated, the kerfed segments 32 have trapezoidal-shaped cross sectional configurations due to the v-shaped kerfs 30. Therefore, each of the kerfed segments 32 have the bottom or lower base width (b), a top or upper base width (a), and a thickness or height equivalent or substantially equivalent to the thickness (Thk) of the insulation board 20 (e.g., such that kerfs 30 do not penetrate through the outside surface 24 or extend into the facing 28 as described above).

The following equations allow specific dimensions of the insulation board 20 illustrated in FIGS. 8A-8D and described herein for a round duct to be determined or calculated accordingly.

$$L1 = \pi D \quad \text{(Equation 1)}$$

$$L2 = \pi d, \text{ where } d \text{ is the inner diameter or } D - 2Thk \quad \text{(Equation 2)}$$

$$b = L1/n \quad \text{(Equation 3)}$$

$$a = L2/n \quad \text{(Equation 4)}$$

$$c = (b-a)/2, \text{ where } c \text{ is ½ the width of the kerf opening at its widest point} \quad \text{(Equation 5)}$$

$$\theta = 2(\arctan(c/ThK)) \quad \text{(Equation 6)}$$

As discussed above, when a thickness (Thk) and outer diameter (D) or outer circumference (L1) of the insulation board are fixed, set, or known depending on a diameter of the duct to be lined and insulation thickness desired, the number (n) of kerfed segments 32 may be adjusted, selected, or determined such that the angle θ between the two planes of the openings of kerfs 30 or the bottom width (b) of the kerfed segments 32 are within the ranges for improved fitting or lining of a round duct (e.g., a small diameter duct). Angle θ may be converted from radians into degrees as typically known.

According to an exemplary embodiment, for a 6 inch inner diameter round duct (e.g., D 6 inches) and an insulation board 20 with an insulation thickness of 1 inch (e.g., Thk=1 inch), the number of segments (n) may be selected such that the angle θ between the two planes of the openings of kerfs 30 and the bottom width (b) of the kerfed segments 32 are within the ranges to provide improved fitting or lining of the 6 inch diameter round duct. The insulation board 20 has an outer circumference (L1) or may be cut to a width of 18.8496 inches based on equation 1. As an example, the number of segments (n) may be selected to be 24. As such, b is determined to be 0.7854 inches based on equation 3 and 6 is determined to be 14.92 in degrees (e.g., θ (180 degrees/Tr radians)) based on equation 6. As the angle θ between the two planes of the openings of kerfs 30 and the bottom width (b) of the kerfed segments 32 are within the ranges discussed above for round ducts, the kerfing is such that fit is improved (e.g., less block-like appearance, better conformity, or reduced or no sagging) or kerf gap reduced (e.g., reduced or no exposure of insulation fibers to the gas stream surface of the duct).

With reference to FIGS. 9A-9D, similarly to round ducts as described above with respect to FIGS. 8A-8D, at least one of: the number (n) of kerfed segments 32, thickness (Thk), or outer diameter (D) or outer circumference (L1) may be pre-determined, adjusted, specified, or selected for an insulation board 20 such that the angle θ between the two planes of the openings of kerfs 30 or the bottom length (b) of the kerfed segments 32 are within ranges to provide improved fitting or lining of a flat oval duct. However, in contrast with round ducts, flat oval ducts have half circular cross sections on opposing ends or sides of the duct and flat portions extending between the half circular cross sections. Therefore, the insulation board 20 has both kerfed and unkerfed sections or segments (e.g., alternating kerfed and unkerfed sections to line the two half circular and flat portions, respectively). For ex-ample, the segments with kerfed segments 32 extend around or line the half circular cross sections (e.g., half a round duct circumference with the same diameter) and the unkerfed segments 33 extend or line the flat portions of the duct. Including kerfed segments in the flat portions of the flat oval duct may cause undesired sagging into the gas stream surface of the duct. A height (H) of the flat oval ducts to be lined is substantially equal to the diameter (D) of the half circular cross sections. Systems and methods for forming kerfed and unkerfed segments for flat oval ducts are described in more detail below with respect to FIGS. 10-12B. Further, as the kerfed segments 32 only extend around half circular cross sections, the outer circumference (L1) is equal to πD/2 as shown below for flat oval ducts. Specific dimensions of the insulation board 20 illustrated in FIGS. 9A-9D and described herein for a flat oval duct may be determined or calculated based on the equations below.

The following equations allow specific dimensions of the insulation board 20 illustrated in FIGS. 9A-9D and described herein for a flat oval duct to be determined or calculated accordingly.

$$L1=\pi D/2 \qquad \text{(Equation 7)}$$

$$L2=\pi d/2, \text{ where } d \text{ is the inner diameter or } D-2Thk \qquad \text{(Equation 8)}$$

$$b=L1/n \qquad \text{(Equation 9)}$$

$$a=L2/n \qquad \text{(Equation 10)}$$

$$c=(b-a)/2, \text{ where } c \text{ is } \tfrac{1}{2} \text{ the width of the kerf opening at its widest point} \qquad \text{(Equation 11)}$$

$$\theta=2(\arctan(c/ThK)) \qquad \text{(Equation 12)}$$

According to an exemplary embodiment, for a 12 inch or about 12 inch inner diameter or height (H) flat oval duct (e.g., D=11.8125 inches) and an insulation board 20 with an insulation thickness of 1 inch (e.g., Thk=1 inch), the number of segments (n) may be selected such that the angle θ between the two planes of the openings of kerfs 30 or the bottom width (b) of the kerfed segments 32 are within the ranges described above for improved fitting or lining of the 12 inch diameter flat oval duct. Each of the kerfed segments 32 of insulation board 20 (e.g., to line opposing half circular ends) have an outer circumference (L1) or may be cut to a width of 18.5550 inches based on equation 7. As an example, the number of segments (n) may be selected to be 12. As such, b is determined to be 1.5463 inches based on equation 9 and θ is determined to be 14.92 in degrees (e.g., θ (180 degrees/Tr radians)) based on equation 12. As the angle θ between the two planes of the openings of kerfs 30 or the bottom width (b) of the kerfed segments 32 are within the ranges discussed above for flat oval ducts, the fit is improved (e.g., less block-like appearance, better conformity, or reduced or no sagging) or kerf gap reduced or substantially eliminated (e.g., reduced or no exposure of insulation fibers to the gas stream surface of the duct). The flat portions of the duct to be lined may be measured to determine the widths of the unkerfed segments 33.

With reference to FIGS. 10-12B, the v-shaped kerfs 30 or kerf segments 32 for the improved fit duct liner insulation embodiments described herein may be formed with pre-determined or specific dimensions by a plurality of appropriately spaced and driven tapered end mill bits (FIG. 10) or sets of stacked steel, ceramic or carbide saw blades of various diameters (FIGS. 11A-12B), As discussed above, for improved fit or conformity within a round or flat oval duct, the insulation board may be provided or manufactured with particular kerfing characteristics or dimensions (e.g., the angle θ between the two planes of the openings of kerfs 30 ranges from 12° to 18°, thickness Thk, or other kerf or kerfed segment dimensions as described herein). As illustrated in FIG. 10A-10B, a tapered router or end mill bit 60 may be sized to cut or remove a v-shaped kerf 30 from the insulation boards as described herein with the depth (e.g., through the thickness Thk of the insulation board) and angle θ (e.g., 15°) required for improved or better fit or conformity when installed within a curvilinear duct. A height of the bit 60 may correspond to the desired depth of the v-shaped kerf to be formed or the thickness Thk of the insulation board. For example, a bit with a height of 2 inches may cut or form a kerf having a depth of 2 inches or about 2 inches (e.g., without cutting into or through the facer or second major surface). The bit 60 may be operably coupled to a computer numerical control (CNC) milling machine 62 for cutting or removing rows of spaced apart kerfs as desired. In other embodiments, a plurality of bits 60 may be attached or operably coupled to the CNC milling machine to cut or remove rows of spaced apart kerfs concurrently or simultaneously.

FIGS. 11A-11B illustrate an improved kerfing apparatus 100 configured in accordance with another embodiment of the present invention. Related duct liner insulation kerfing or grooving apparatuses are described in greater detail below and in U.S. Pat. Nos. 5,855,154 and 3,875,835, both of which are incorporated herein by reference for all purposes in their entireties. The kerfing apparatus 100 may include one or more of sets of stacked circular saw blades 102 (e.g., equal to number of kerfed segments (n)-1) mounted on a rotatable shaft 106 (e.g., an axle or drive shaft) and configured to cut or form v-shaped kerfs (e.g., kerfs 30) from insulation boards as described herein with the dimensions (e.g., depth) or angles (e.g., θ) for improved fit. For example, if 24 kerfed segments 32 are desired, then 23 sets of blades 102 may be provided such that the 24 kerfed segments may be kerfed concurrently or simultaneously.

Each set of stacked circular saw blades 102 includes an odd number of saw blades 104 with varying diameters (e.g., three or more) such that v-shaped kerfs may be cut or approximated. For example, as illustrated in FIG. 11A, the set of stacked circular saw blades 102 includes 7 individual saw blades 104. A center or central saw blade 104a has the largest diameter with blades (e.g., blades 104b, 104c, 104d) having progressively smaller diameters (e.g., diameter of each subsequent blade 104 is stepped down) stacked on or flanking each side of the center saw blade 104a in a mirrored configuration. The diameter of each blade 104 within the set 102 and the number of saw blades 104 may be sized to cut or remove a v-shaped kerf with desired or appropriate depth (e.g., about 1 to 4 inches) depending on thickness Thk of the insulation board such that the kerfs 30 do not do not extend into the facing 28 or penetrate through the second major surface 24 or angle θ (e.g., 12–18 degrees) through the thickness of the insulation board 20 as described in more detail below. Further, in some embodiments, to provide a minimum cutting tolerance between diameters of the shaft 106 and the blades 104, the smallest diameter blade 104 may sized to be at least 0.5 to 1.0 inches, or any value therebetween larger in diameter relative to the shaft 106 diameter. In some embodiments, the shaft may include spacer sleeves. In such embodiments, the smallest diameter blade 104 may sized to be at least 0.5 to 1.0 inches, or any value therebetween larger in diameter relative to the shaft 106 diameter combined with the thickness of the spacer sleeves.

The rotatable shaft 106 may be operably coupled to a single power source 105 (e.g., a motor) for rotating or turning the shaft during a kerfing process. The shaft 106 may have a non-round (e.g., hexagonal) cross sectional configuration. In other embodiments, the shaft may have a round or other suitable cross sectional configuration (e.g., square or rectangular). The blades 104 or sets of blades 102 may be slid on or off (e.g., installed or removed) as necessary for reconfiguration, repair, or replacement.

Further, the apparatus 100 may include one or more spacers or spacer sleeves 108 disposed or positioned between or intermediate sets of blades 102. A width of the sleeves 108 may be equal to or substantially equal to (e.g., set or selected) to the top or upper base length (a) of the kerfed segments 32 between kerfs 30. Therefore, the width of the sleeves may be varied to vary the width (a) of the kerfed segments 32 of an insulation board 20. Mounting openings in the rotary saw blades 104 or the spacer sleeves 108 may be complementary in cross section to the cross section of the drive shaft 106. In some embodiments, mounting openings of the spacer sleeves 108 are non-complementary (e.g., round relative to hexagonal). Accordingly, the rotary saw blades 104 or the spacer sleeves 108 may rotate with the drive shaft and can be readily removed from or placed on the drive shaft 106. A shaft 106 with a non-round or hexagonal cross sectional configuration may allow axial positions of the blades 104 or spacer sleeves 108 to be fixed relative to the shaft without additional support arms, set screws, keying, or the like. A shaft with a round configuration may be keyed 109 (FIGS. 12A-12B) and mounting openings of the blades 104 or spacer sleeves provided with a complementary key portion such that axial positions of the blades 104 or spacer sleeves 108 may be fixed accordingly.

As described above, to line flat oval ducts, the insulation board 20 may have both kerfed and unkerfed sections or segments (e.g., alternating kerfed and unkerfed sections to line the two haft circular and flat portions, respectively). In such embodiments, the apparatus may include one or more spacers or spacer sleeves 108 having a width equal to or substantially equal to a width of the flat portions. In some embodiments, the apparatus 100 includes two spacers or spacer sleeves alternating with sets of blades 102 to form unkerfed segments corresponding to the widths of the flat portions and kerfed segments corresponding to widths or circumferences required for the circular portions, respectively. For the kerfed segments, the apparatus may include smaller spacer sleeves to space apart the sets of blades 102 within the kerfed segments. While not illustrated in FIGS. 11A-12B, each of the blades 104 may include teeth for cutting the kerfs 30. Further, the apparatus 100 may include feed rolls for passing insulation boards through the apparatus for kerfing. In yet further embodiments, instead of blades 104 or end mill bits 60, the kerfs 30 may be cut with a laser.

Figure 13A:
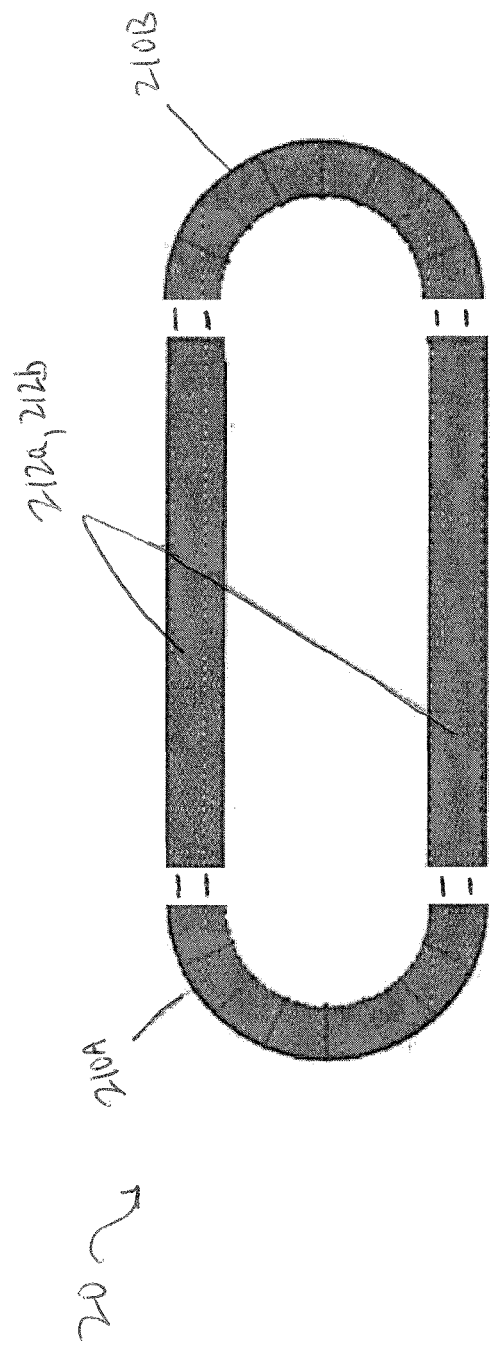
FIGS. 13A-13B are cross sectional views of a duct liner insulation for a flat oval duct with separately formed kerfed and unkerfed segments prior to and after being coupled in accordance with an exemplary embodiment of the present disclosure.
Figure 13B:
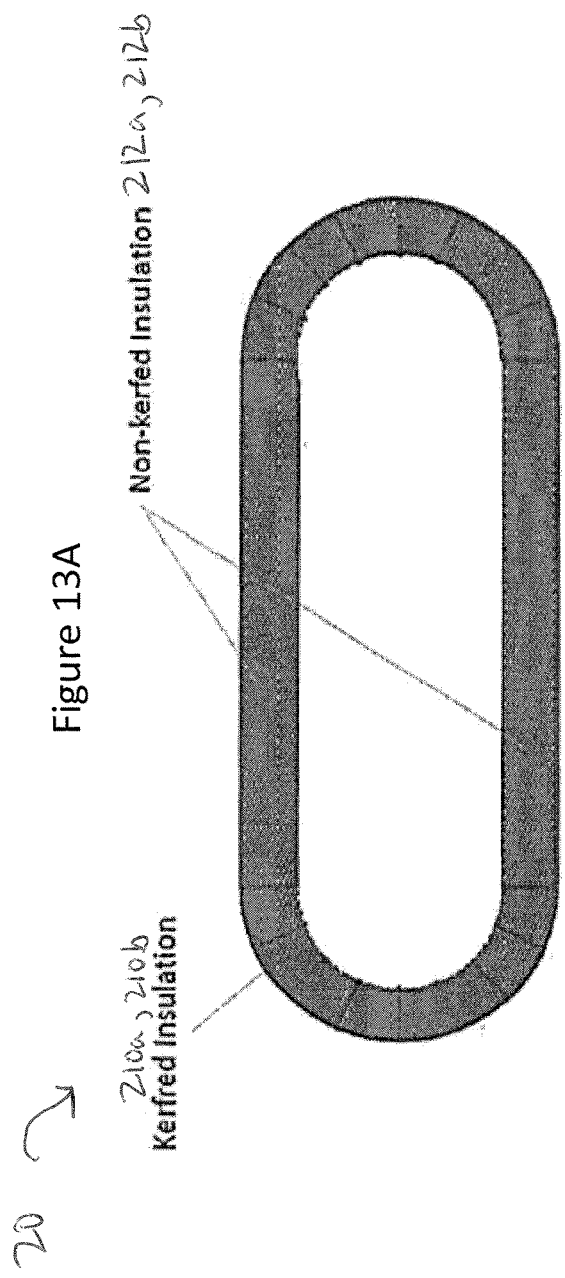

With reference to FIGS. 13A-13B, an improved system and method of forming duct liner insulation for flat oval ducts (e.g., FIGS. 4-5) with separate or multiple unkerfed and kerfed segments as described herein is provided. While, unitary or monolithically formed insulation boards 20 may be provided with kerfed and unkerfed segments as described above; in certain embodiments, the kerfed and unkerfed segments 210 and 212 may be formed separately (FIG. 13A) and later joined or otherwise coupled together (FIG. 13B). Kerfed segments may be formed as described herein for improved fit of a round duct. For example, for a flat oval duct with circular ends having a diameter (D) or height (H), a kerfed insulation board formed according to embodiments as described herein to improve fit within a round duct with a diameter (D) equal to the diameter (D) or height (H) of the flat oval duct may be used. The kerfed insulation board for the round duct may be cut in half for example, with each half (e.g., kerfed segment 210a and kerfed segment 210b) used to line the opposing circular ends of the flat oval duct. Unkerfed segments 212a and 212b may then be sized for the flat portions of the flat oval duct. The separately formed kerfed and unkerfed segments may be joined (e.g., butt joints glued or taped along a length of the segments) and installed within the flat oval duct. While four separate pieces are illustrated (e.g., 2 kerfed and 2 unkerfed segments), in other embodiments, other combinations may be formed and joined as well. For example, two separate pieces, three separate pieces, or more.

While referring specifically to lining curvilinear ducts including round and flat oval ducts in several embodiments, the duct liner insulation 10 may be installed or line ducts with other cross sectional configurations including square, rectangular, or triangular. Additionally, in some embodiments, the duct liner insulation 10 may be used to insulate or line duct transitions and fittings as well. Further, the duct liner insulation 10 may in addition, or instead, may line or insulate an exterior or outer surface of an insulated pipe or duct (e.g., as an external wrap or liner).

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth. The term "or" in reference to a list of two or more items, covers all of the following interpretations of the word: any of the items in the list, all of the items in the list, and any combination of items in the list.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A duct liner insulation for a curvilinear duct, the duct liner insulation comprising:
   an insulation board having a first major surface and a second major surface, wherein the first major surface is configured to be a gas stream surface and the second major surface is configured to extend around an inner periphery of a curvilinear duct when the insulation board is installed within the curvilinear duct, the insulation board having a length, width, and thickness; and
   a plurality of rows of kerfs in the first major surface of the insulation board configured to allow the insulation board to flex in a direction of the width of the insulation board such that insulation board is foldable into a curvilinear configuration, the insulation board having a cross sectional configuration substantially mirroring a cross sectional configuration of the inner periphery of the curvilinear duct when installed, each of the kerfs having a v-shaped cross section with sidewalls extending from a kerf base portion at or near the second major surface of the insulation board to the first major surface of the insulation board, the sidewalls extending at an angle from 11 degrees to 19 degrees relative to each other.

2. The duct liner insulation of claim 1, wherein a first row of kerfs of the plurality of rows of kerfs is formed between first and second kerfed segments, the first and second kerfed segments having trapezoidal cross sectional configurations, each of the first and second kerfed segments having an upper base width (a) and a lower base width (b).

3. The duct liner insulation of claim 2, wherein the lower base width (b) ranges from 0.6 inches to 1.6 inches.

4. The duct liner insulation of claim 2, wherein the lower base width (b) ranges from 0.6 inches to 1.0 inches.

5. The duct liner insulation of claim 1, wherein the sidewalls extend at an angle from 13 degrees to 17 degrees relative to each other.

6. The duct liner insulation of claim 1, wherein the sidewalls extend at an angle from 14 degrees to 16 degrees relative to each other.

7. The duct liner insulation of claim 1, wherein the first major surface comprises a facing.

8. The duct liner insulation of claim 1, wherein the second major surface comprises a facing.

9. The duct liner insulation of claim 1, wherein the thickness of the insulation board ranges from 1 inches to 3 inches.

10. The duct liner insulation of claim 1, wherein a depth of the kerfs does not penetrate the second major surface.

11. The duct liner insulation of claim 1, wherein the curvilinear duct comprises a round duct.

12. The duct liner insulation of claim 11, wherein the round duct comprises a diameter from 6 inches to 12 inches.

13. The duct liner insulation of claim 1, wherein the curvilinear duct comprises a flat oval duct.

14. The duct liner insulation of claim 13, wherein the flat oval duct comprises a height from 6 inches to 12 inches.

15. The duct liner insulation of claim 13, wherein the insulation board comprises kerfed segments and unkerfed segments, the kerfed segments configured to line round portions of the flat oval duct and the unkerfed segments configured to line flat portions of the flat oval duct when the insulation board is installed.

16. The duct liner insulation of claim 15, wherein the kerfed and unkerfed segments are monolithically formed.

17. The duct liner insulation of claim 15, wherein the kerfed and unkerfed segments are separately formed and configured to be joined together to be installed within the flat oval duct.

18. The duct liner insulation of claim 11, wherein the angle is equal to $2(\arctan(c/ThK))$, where c is equal to ½ of a width of each kerf opening at a widest point of the kerf opening and ThK is a thickness of the insulation board.

19. The duct liner insulation of claim 18, wherein c is equal to $(b-a)/2$, where b is a bottom width of each kerfed segment and a is a top width of each kerfed segment.

20. The duct liner insulation of claim 19, wherein:
   a is equal to L2/n, where L2 is equal to $\pi d$, where d is an inner diameter of the insulation board and n is equal to a number of kerfed segments of the insulation board; and
   b is equal to L1/n, where L2 is equal to $\pi D$, where D is an outer diameter of the insulation board and n is equal to a number of kerfed segments of the insulation board.

21. The duct liner insulation of claim 13, wherein the angle is equal to $2(\arctan(c/ThK))$, where c is equal to ½ of a width of each kerf opening at a widest point of the kerf opening and ThK is a thickness of the insulation board.

22. The duct liner insulation of claim 21, wherein c is equal to $(b-a)/2$, where b is a bottom width of each kerfed segment and a is a top width of each kerfed segment.

23. The duct liner insulation of claim 22, wherein:
   a is equal to L2/n, where L2 is equal to $\pi d/2$, where d is an inner diameter of the insulation board and n is equal to a number of kerfed segments of the insulation board; and
   b is equal to L1/n, where L2 is equal to $\pi D/2$, where D is an outer diameter of the insulation board and n is equal to a number of kerfed segments of the insulation board.

* * * * *